United States Patent [19]

Rees

[11] Patent Number: 4,572,469
[45] Date of Patent: Feb. 25, 1986

[54] LATCHING ARRANGEMENT FOR SEAT SLIDE STRUCTURES

[75] Inventor: Richard W. A. Rees, West Bloomfield, Mich.

[73] Assignee: General Motors Corporation, Detroit, Mich.

[21] Appl. No.: 710,288

[22] Filed: Mar. 11, 1985

[51] Int. Cl.$^4$ ............................................. F16M 13/00
[52] U.S. Cl. ................................. 248/430; 296/65 R; 297/341
[58] Field of Search .................. 248/430, 429, 424; 297/341; 296/65 R; 312/333

[56] References Cited

U.S. PATENT DOCUMENTS

| | | | |
|---|---|---|---|
| 3,524,677 | 8/1970 | Louton | 248/430 X |
| 3,940,182 | 2/1976 | Tamura | 297/341 |
| 4,004,772 | 1/1977 | Pickles | 248/430 |
| 4,169,574 | 10/1979 | Garvey et al. | 296/65 R X |
| 4,204,658 | 5/1980 | Courtois | 248/430 |
| 4,262,963 | 4/1981 | Bauer et al. | 248/430 X |
| 4,378,101 | 3/1983 | Kazaoka et al. | 248/430 X |
| 4,497,518 | 2/1985 | Nishimura et al. | 297/341 |

Primary Examiner—Ramon S. Britts
Assistant Examiner—Ramon O. Ramirez
Attorney, Agent, or Firm—Herbert Furman

[57] ABSTRACT

A latching arrangement for seat slide structures includes a latch member which is fulcrumed on one track member of the slide structure and includes a latching portion which extends inwardly of the one track member and has latched teeth, engageable within openings in the other track member and in the one track. The latch member is biased to latched position by a hairpin type spring.

1 Claim, 5 Drawing Figures

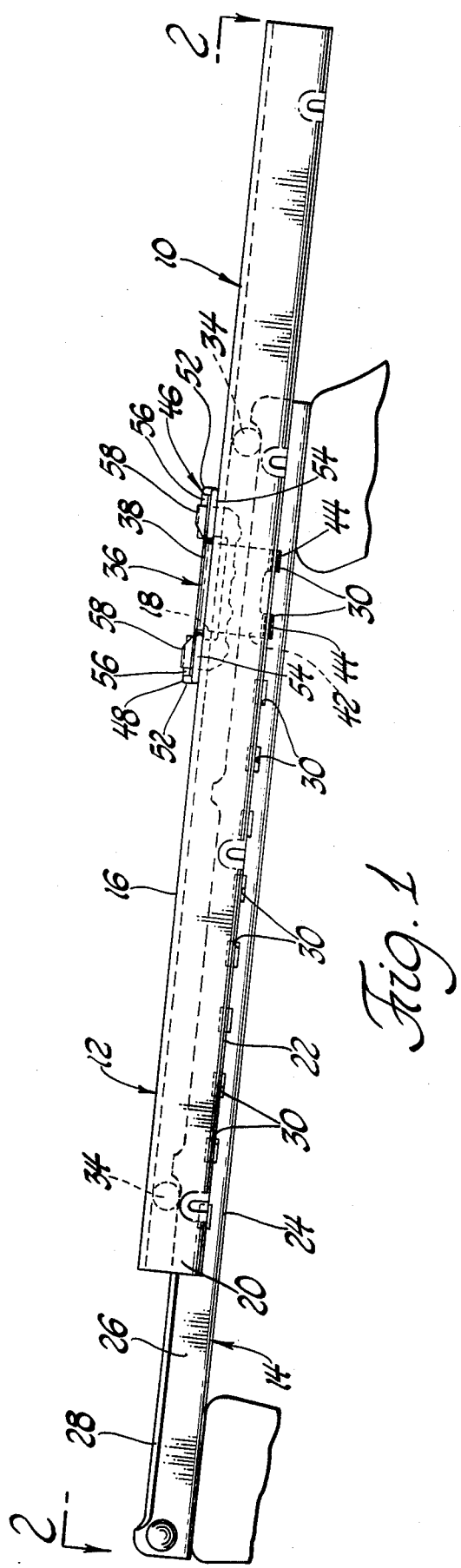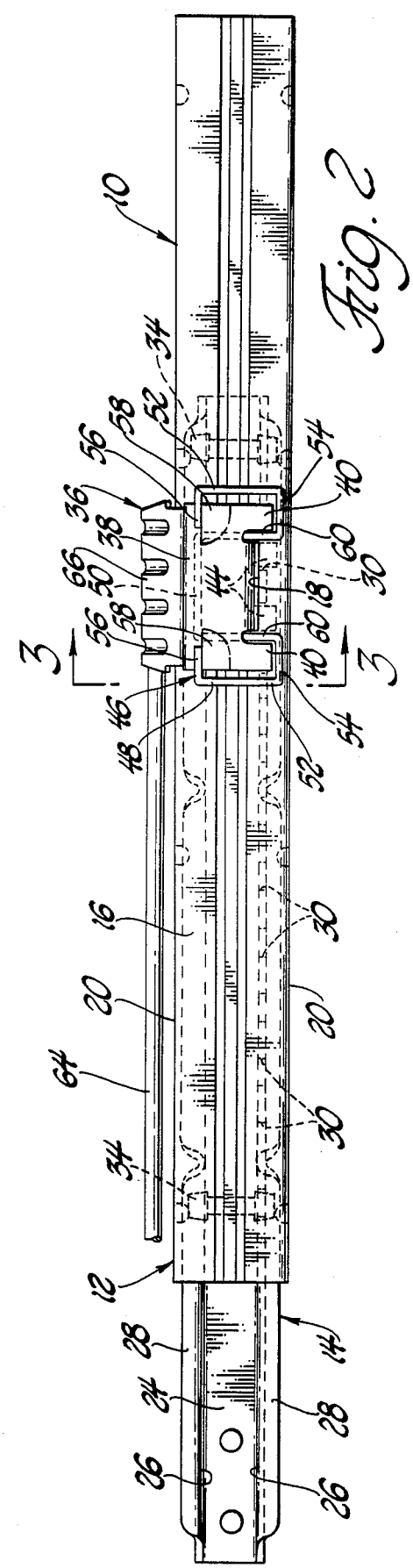

LATCHING ARRANGEMENT FOR SEAT SLIDE STRUCTURES

This invention relates generally to a latching arrangement for seat slide structures and more particularly to a latching arrangement for latching the track members of a seat slide structure to each other.

The latching arrangement of this invention is intended for use with seat slide structures wherein the track members are generally U-shaped and internested with each other, with the track members including base walls, side walls and terminal flanges which are located in respective opposed relationship to each other.

In its preferred embodiment, the latch structure includes a latch member which overlies an opening in the base wall of the upper or one track member and includes fulcrum portions which fulcrum the latch member on the one track member to one side of the opening therein. The latch member includes a latching portion which extends inwardly of the one track member. In latched position, teeth of the latch member extend outwardly through a pair of a series of openings in the side wall of the other track member and into a pair of openings in the terminal flange of the one track member to thereby releasably latch the track members to each other. The latch member is resiliently biased to latched position by a hairpin type spring which includes a first portion located within the one track member and engaging the inner side of the base wall thereof and a second portion located outwardly of the one track member and engaging the outer side of the latch member.

The primary feature of this invention is that it provides an improved latching arrangement for seat slide structures wherein a latch member is fulcrumed on one of the track members of the seat slide structure and extends inwardly thereof and then outwardly into latching engagement with openings in the other track member and also in the one track member. Another feature is that the latch member is fulcrumed to one side of an opening in the base wall of the one track member and includes a latching portion which extends inwardly of the one track member and then outwardly through openings in a side wall of the other track member into latching engagement with openings in the terminal flange of the one track member. A further feature is that the latch member is biased to latched position by a hairpin type spring which engages both the latch member and the base wall of the one track member.

These and other features will be readily apparent from the following specification and drawings wherein:

FIG. 1 is a side elevational view of a seat slide structure embodying a latch arrangement according to this invention.

FIG. 2 is a top plan view of the seat slide structure.

Figure 5:
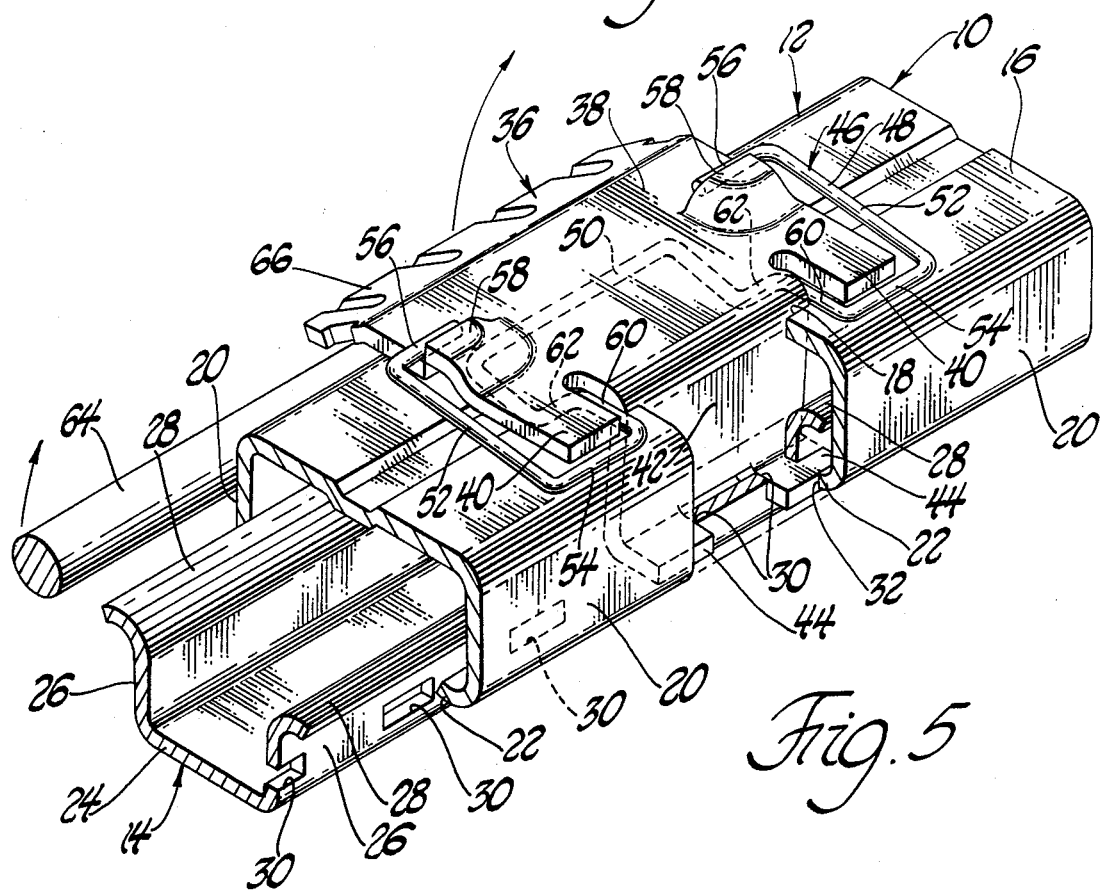
FIG. 5 is a partial broken-away perspective view.

Referring now to FIG. 1 of the drawings, a seat slide structure 10 includes an upper track member 12 and a lower track member 14. The upper track member is conventionally secured to a seat structure and the lower track member is conventionally secured to the vehicle to thereby mount the seat structure on the vehicle for horizontal movement to a plurality of adjusted positions. As best shown in FIG. 5, the upper track member 12 includes a base wall 16 having a generally rectangular opening 18 therein and a pair of side walls 20, each of which terminates in an arcuate inwardly extending terminal flange 22. The lower track member 14 includes a base wall 24 which is located in spaced opposed relationship to the wall 16, a pair of side walls 26, each located in opposed spaced relationship to a respective side wall 20 of the track member 12, and a pair of arcuate terminal flanges 28, each located in opposed spaced relationship to a like flange 22 of the upper track member 12. One of the side walls 26 of the lower track member is provided with a series of spaced openings 30. Each successive pair of these openings is alignable with a pair of openings 32 in the edge of the terminal flange 22 of the upper track member 12 which confronts this one side wall 26 of the lower track member.

Figure 3:
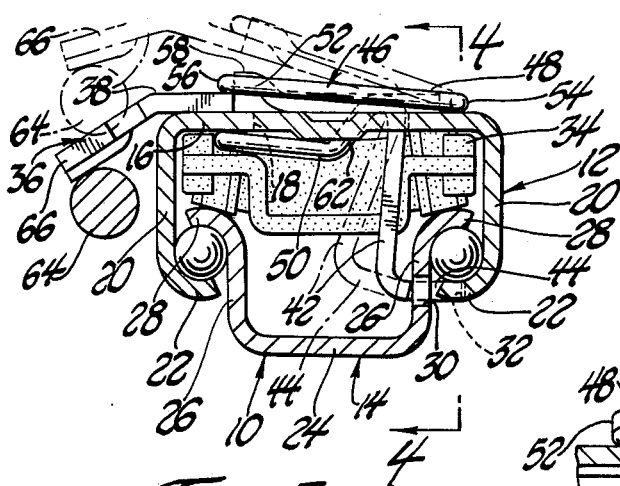
FIG. 3 is an enlarged sectional view taken along line 3—3 of FIG. 2.

The upper track member 12 is supported on the lower track member 14 for horizontal adjustment by a bearing assembly 34, FIG. 3, which is the same as that disclosed and claimed in copending application Ser. No. 709,881 Rees filed Mar. 8, 1985 and assigned to the assignee of this invention. Any suitable bearing assembly can of course be used with the latching arrangement of this invention.

A latching arrangement 36 in accordance with this inveniton includes a latch member 38 which is generally planar and overlies the opening 18 in the base wall 16 of the upper track member 12. The latch member 38 includes a pair of ears or fulcrum portions 40 which extend past one side edge of the opening 18 and seat on the outer side of the base wall 16. The latch member further includes a laterally extending latching portion 42 which extends inwardly of the track member 12 immediately adjacent the one side edge of the opening 18 and terminates in a pair of lateral outwardly extending latch teeth 44. The teeth 44 are receivable in any successive pair of the openings 30 of the lower track member 14 and the openings 32 of the upper track member 12 to thereby releasably latch the upper track member to the lower track member.

Figure 4:
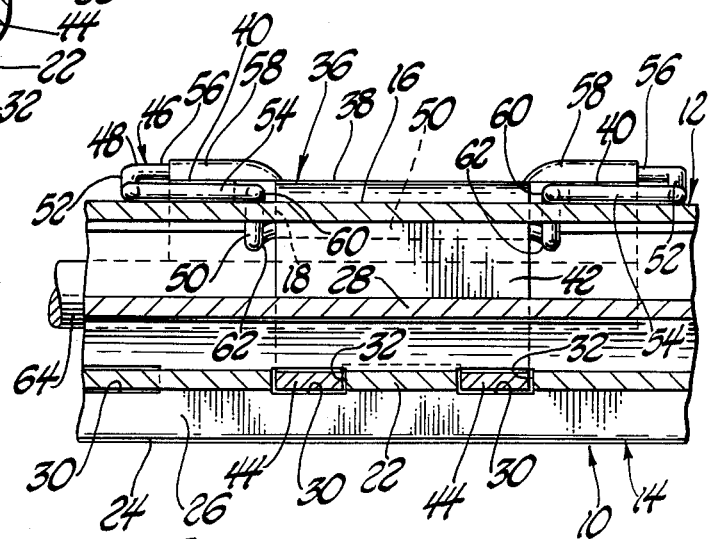
FIG. 4 is a view taken along line 4—4 of FIG. 3.

A hairpin type spring 46 includes a first or outer portion 48 which is located outwardly of the track member 12 and a second or inner portion 50 which is located inwardly thereof. The portion 48 includes like spaced end legs 52 having integral lateral legs 54 and 56 extending therefrom. The legs 56 seat on the upper or outer side of latch member 38 against lanced embossed tabs 58 of the latch member, while the legs 54 seat on the base wall 16 adjacent the end edges of the fulcrum portions 40. The legs 54 are integrally joined to legs 60 which extend inwardly of the track member 12 past the side edges of the fulcrum portions 40 and the latching portion 42 into integral merger with the portion 50 across offset integral juncture legs 62. The inner portion 50 seats on the inner side of the base wall 16 of track member 12 generally opposite the legs 56 of the outer portion 48 as can best be seen in FIG. 3. The inner and outer portions of the spring 46 are resiliently biased toward each other so that the spring normally maintains the latch member 38 in latched position as shown in full lines in FIGS. 3, 4 and 5, with the latch member seating on the outer side of the base wall 16, to maintain the latch teeth 44 within the openings 30 and 22.

An operating rod 64 is secured to an angled portion 66 of the latch member 38 to move the latch member to its unlatched position, shown in dash lines of FIG. 3, when the operating rod is rotated clockwise as indicated in FIG. 5. When the latch member is moved to its unlatched position by the operating rod, it fulcrums about the fulcrum portions 40 against the bias of the spring 46 to move the teeth 44 out of the openings 32 and 30 to thereby permit horizontal adjustment of the track member 12 relative to the track member 14.

When the track members are moved to the desired horizontally adjusted position, the operating rod 64 is released and the spring 46 thereupon returns the latch member to its latched position with the teeth 44 engaging a different successive pair of the openings 30 and the same openings 32 to maintain the track member 12 in its new adjusted position.

Thus this invention provides an improved latching arrangement for seat slide structures.

The embodiments of the invention in which an exclusive property or privilege is claimed are defined as follows:

1. A seat slide comprising, in combination, a pair of generally U-shaped internested track members, each track member including a base wall, side walls extending therefrom and terminal flanges, with the base wall, side walls and terminal flanges of the track members being located in respective opposed spaced relationship to each other, bearing means movably supporting one track member on the other track member for movement relative thereto, the base wall of the one track member including an opening therethrough, one side wall of the other track member including a series of openings therein, at least one of which is alignable with at least one opening in one of the terminal flanges of the one track member, a latch member having its inner side overlying the outer side of the base wall of the one track member and including fulcrum portions fulcruming the latch member on such base wall to one side of the opening in such base wall, the latch member including a latch portion extending inwardly of the base wall of the one track member through the opening therein and terminating in at least one laterally extending latch tooth engageable with one of the openings in the side wall of the other track member and the one opening in the flange of the one track member to latch the track members to each other, a torsion type spring member including first and second portions biased toward each other, the first portion of the spring member engaging the inner side of the base wall of the one track member and the second portion of the spring member engaging the outer side of the latch member to engage the inner side of the latch member with the outer side of the base wall of the one track member and maintain the latch tooth within the openings in the side wall of the other track member and terminal flange of the one track member, and means secured to the latch member to rotate the latch member about the fulcrum portions thereof and move the latch tooth out of the opening in the side wall of the other track member to permit movement of the one track member relative to the other track member.

* * * * *